May 11, 1965 W. F. HANNON 3,182,428
APPARATUS FOR GRINDING A BEVEL ON CIRCULAR OBJECTS
Filed Dec. 17, 1959 2 Sheets-Sheet 1

INVENTOR
WILLIAM F. HANNON
BY
Mitchell & Bechert
ATTORNEYS

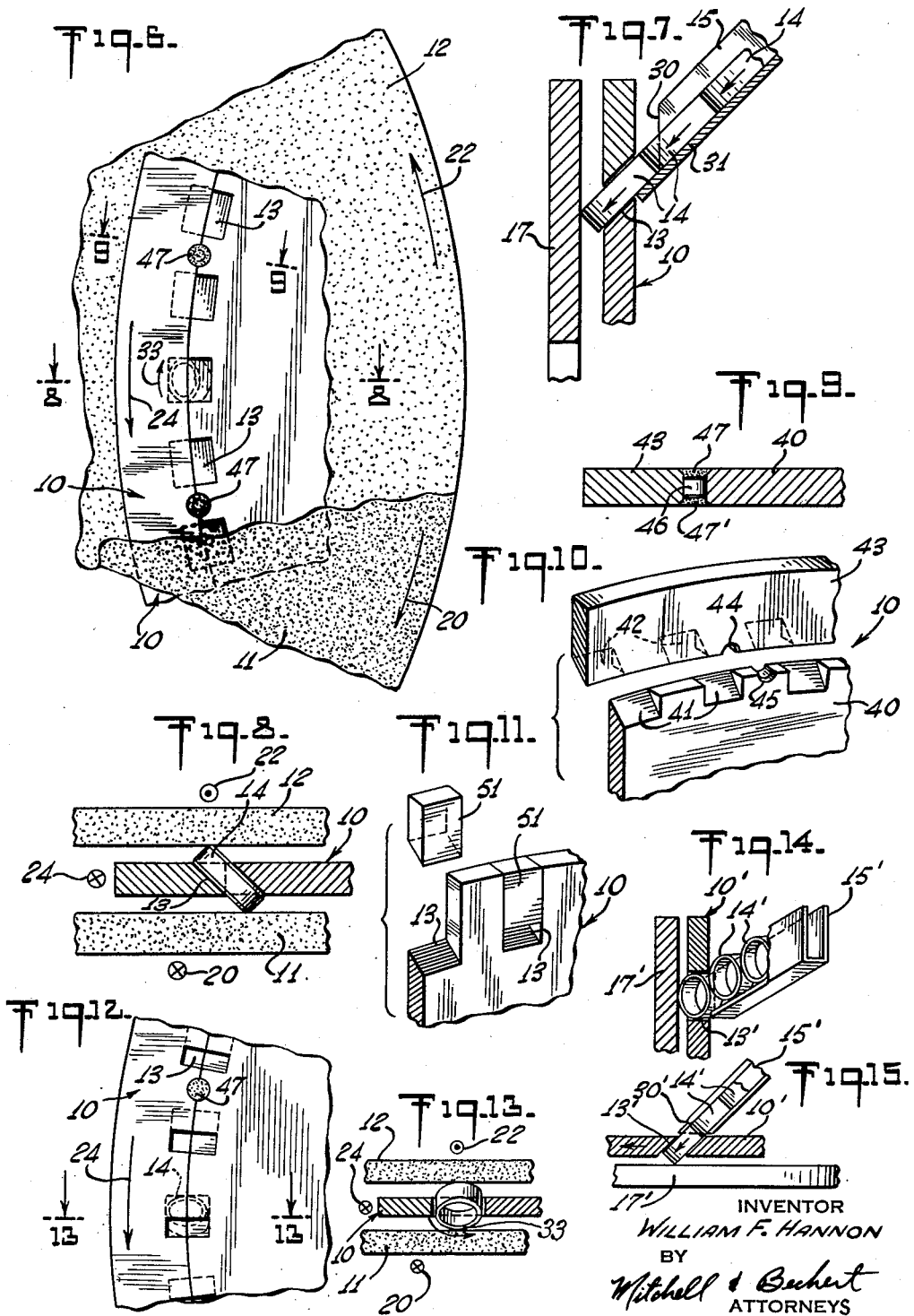

United States Patent Office 3,182,428
Patented May 11, 1965

3,182,428
APPARATUS FOR GRINDING A BEVEL ON CIRCULAR OBJECTS
William F. Hannon, Berlin, Conn., assignor to The Fafnir Bearing Company, New Britain, Conn., a corporation of Connecticut
Filed Dec. 17, 1959, Ser. No. 860,228
6 Claims. (Cl. 51—118)

This invention relates to an apparatus for grinding circular objects and, more particularly, to an apparatus for grinding peripheral portions of circular objects.

In the past, it has been necessary to remove corners or material from the end surfaces of small parts, such as, for example bearing rings, by machining each part or by stoning each part by hand. Such prior methods have not been entirely satisfactory in that they are slow, cumbersome and inefficient.

Moreover, past grinding methods, particularly of very small objects, have been limited to instances where the grinding means can be applied over the entire surface to be ground, such surfaces being, for example, the face of bearing rings. However, when it it desired to grind a peripheral end surface or a corner of a cylindrical bearing race, the grinding means can be applied at any instant only to an extremely small portion of the total surface to be ground.

It is an object of the present invention to provide an apparatus for grinding objects automatically.

Another object of the invention is to provide an apparatus for removing peripheral portions automatically from relatively small bearing parts.

Another object of this invention is to provide an apparatus for receiving a plurality of small objects successively, grinding predetermined peripheral portions of each object and dispensing the objects automatically.

This invention, generally, involves the placing of an object to be ground on a conveyor and supporting the object in a predetermined position on the conveyor. The supported object is then moved past a grinding surface for grinding the object, and after the grinding operation, the object is dispensed automatically.

An apparatus operable in accordance with the invention includes a grinding surface movable in a predetermined path and a conveyor means movable past the grinding surface. The conveyor means is adapted to support an object to be ground and to dispense the object automatically after the grinding operation.

One form of an apparatus in accordance with the invention embodies two discs spaced apart a predetermined distance to form a space therebetween, at least one of the discs being provided with a grinding surface. A conveyor in the form of a circular plate is provided with a plurality of slots spaced apart around the plate adjacent the periphery to receive parts to be ground from a suitable dispenser. The conveyor moves each successive part through the space between the discs for the grinding operation.

Other objects and advantages of the present invention will become apparent from the following detailed description of one preferred embodiment thereof taken in conjunction with the accompanying drawings, in which:

FIG. 6 is a view in elevation of a fragmentary portion, partly in section, taken along the line 6—6 in FIG. 1;

FIG. 7 is a view in elevation, partly in section, taken along the line 7—7 in FIG. 1;

FIG. 8 is a plan view, taken along the line 8—8 in FIG. 6;

FIG. 9 is a cross sectional view, taken along the line 9—9 in FIG. 6;

FIG. 10 shows an exploded fragmentary view of one arrangement to obtain angularly disposed slots adjacent the periphery of the circular plate shown in FIG. 1;

FIG. 11 is a fragmentary exploded view of another arrangement for obtaining the angularly disposed slots;

FIG. 12 is a fragmentary view in elevation showing the slots vertically disposed to receive a bearing ring in a vertical position;

FIG. 13 is a view in cross section, taken along the line 13—13 in FIG. 12;

FIG. 14 is a fragmentary view in elevation partly in section showing a dispenser for delivering bearing rings in a vertical position to be received in vertical slots, as shown in FIG. 12;

FIG. 15 is a plan view of the arrangement shown in FIG. 14.

The term "grinding" as used in the following description is intended to include all the various degrees of abrasive actions such as polishing, honing and the like.

In accordance with this invention, an entire peripheral portion, either the edge or the peripheral surface, of a circular object is ground automatically. To accomplish this grinding action, the object to be ground is placed on a suitable conveyor and is supported in a position on the conveyor whereby the plane including the circular cross section of the object is at the desired angle relative to the direction of movement of the conveyor. With the object to be ground supported in this manner, it is moved through a space between two surfaces at least one of which is a grinding surface.

While the above steps are sufficient in many instances, the invention permits extremely accurate grinding of the entire peripheral portion of a circular object by arranging the conveyor to transport the object in an arcuate path so that the direction of rotation of the object is reversed completely and automatically during the grinding operation and the rate of the grinding action is varied between maximum and minimum values. This action will become more apparent from the following description.

Figure 1:
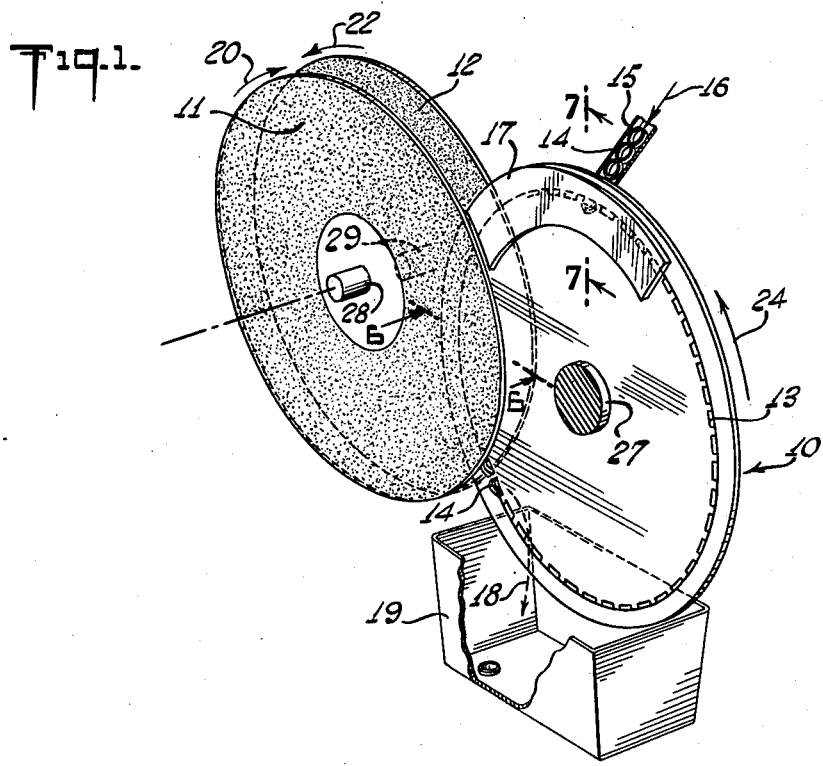
FIG. 1 is view in perspective of one form of an apparatus illustrating the invention.

Referring now to one form of an apparatus, in accordance with the invention, as shown in FIG. 1, a circular plate conveyor 10 is rotatable in a space provided between two grinding discs 11 and 12. A plurality of slots, each identified by the numeral 13, are spaced apart around the plate conveyor 10 adjacent the periphery, and each slot is dimensioned appropriately to receive a desired object which, in this instance, is a bearing ring 14.

A plurality of bearing rings 14 are contained in a dispenser 15 positioned at an angle or bevel, as shown in FIG. 1, so that the bearing rings 14 are delivered successively to the slots 13 either by gravity or by a suitable force, such as a compression spring indicated by the arrow 16. The term "bevel" is used in the conventional sense of meaning a deviation or incline so as not to be parallel or at right angles with a given line or surface. As seen in FIG. 1, each bearing ring 14 is supported in a flat, or horizontal, position, as contrasted with the alternative position as shown in FIG. 14.

Figure 2:
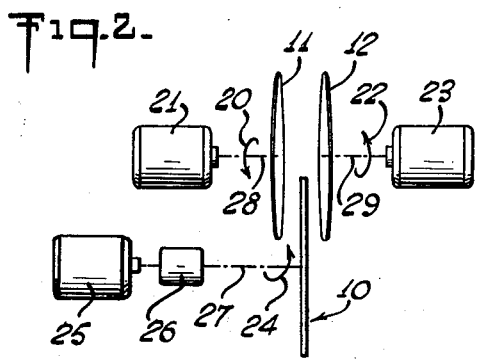
FIG. 2 is a plan view illustrating diagrammatically the relative positions of the perspective discs shown in FIG. 1 with their motor driving means.
Figure 3:
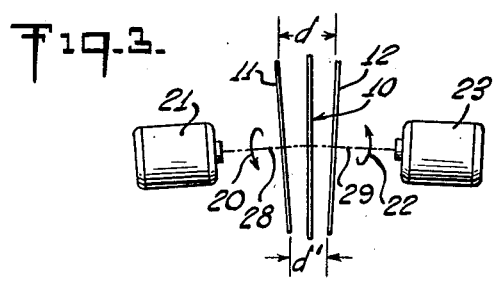
FIG. 3 is a view in elevation of the arrangement shown in FIG. 2 illustrating the relative positioning of the two outer discs closer together at the bottom than at the top.

The grinding discs 11 and 12 are spaced apart a predetermined distance to form a space therebetween, as shown diagrammatically in FIG. 2. Also, the discs 11 and 12 are tilted relative to each other so that they are closer together at the bottom than at the top, as shown in FIG. 3.

For illustrative purposes only, the two grinding discs 11 and 12 are positioned so that the dimension $d$ is approximately .015 inch greater at the tops than the dimension $d'$ at the bottoms. With the discs 11 and 12 placed relative to each other in this manner, each bearing ring 14 is received readily in the space between the two discs before the grinding action commences, and as each ring 14 is conveyed through the space between the two discs 11 and 12, progressively more material is ground from each ring.

The "predetermined distance" at which the two discs 11 and 12 are spaced, as mentioned above, is obtained by the vertical projection of the bearing ring 14 as it is supported in the position shown either in FIG. 8 or in FIG. 13. In this manner, the discs 11 and 12 contact the bearing ring 14 on opposite sides and, also, keep it within the slot 13 during the grinding operation.

Since the space between the discs 11 and 12 is just sufficient to receive each ring 14 in its set position in each slot 13, no other means is required to retain the ring 14 in the slot 13. However, upon the dispensing of each ring 14 from the dispenser 15, a fixed work guide 17 is positioned on the opposite side of the circular plate conveyor 10 so that each ring 14 bears against the guide 17 until it is delivered between the two discs 11 and 12.

Upon conclusion of the grinding operation, each bearing ring 14 is discharged automatically from the slot 13, as indicated by the arrow 18 in FIG. 1. A suitable receptacle 19, which may take the form of a chute or other structure, is positioned beneath the circular plate conveyor 10 so that each bearing ring 14 slides out of its slot after leaving the two discs 11 and 12 and falls by gravity into the receptacle 19.

Although a single motor may be used to drive both discs with appropriate interconnection, FIG. 2 of the drawings illustrates the grinding disc 11 being rotated in a direction indicated by the arrow 20 due to the action of a suitable motor driving means 21, whereas the grinding disc 12 is rotated in the opposite direction, as indicated by the arrow 22, by a second motor driving means 23.

Also as seen in FIG. 2, the circular plate conveyor 10 is rotated in a direction indicated by the arrow 24 by a suitable motor driving means 25. Since it is desired that the conveyor 10 be turned at a slower speed, a gear reduction device 26 is disposed intermediate of the motor 25 and the conveyor 10. For illustrative purposes only, the two motors 21 and 23 are driven at approximately 1730 r.p.m., whereas the motor 25 is turning at approximately 36 r.p.m.

The circular plate conveyor 10, as seen in FIG. 1, is fixedly attached to a shaft 27, whereas the disc 11 is fixedly attached to a shaft 28 and the disc 12 is fixedly attached to a similar shaft 29. These shafts 27, 28 and 29 are connected with motors 25, 21 and 23, respectively (FIG. 2).

The dispenser 15, mentioned above, is shown in detail in FIG. 7 of the drawings. The sides of the dispenser 15 terminate at the ends 30 which are shorter than the bottom surface 31 of the dispenser 15 so that each bearing ring 14 is cleared for lateral movement when the forward edge of the ring 14 contacts the fixed guide plate 17.

Figure 4:
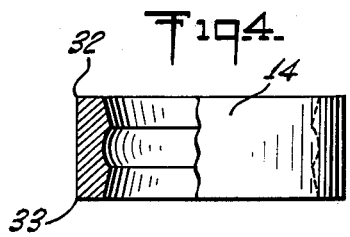
FIG. 4 is a view, partly in section, of an outer bearing ring before the grinding operation.
Figure 5:
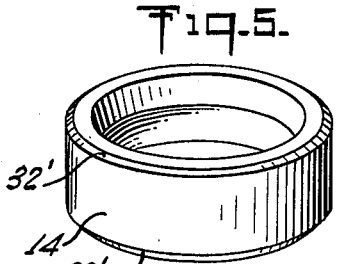
FIG. 5 is a view in perspective of the outer bearing ring shown in FIG. 4 after the grinding operation has removed the corners of the ring.

Although the description herein refers to a bearing ring as the object being ground, it is understood that any suitable object may be ground with the apparatus described herein. However, referring to the bearing ring shown in FIG. 4 for illustrative purposes, the portion in cross section shows the corners or edges 32 and 33 which are to be ground to a suitable bevel such as shown in FIG. 5 by the reference numerals 32' and 33'. The action by the grinding discs 11 and 12 on the opposite corners of a bearing ring 14 during the grinding operation is best seen in FIG. 8 of the drawing for a ring 14 which is dispensed as shown in FIG. 7 and in FIG. 13 for a ring 14 which is dispensed as shown in FIG. 14.

The bearing ring 14 is suitably positioned within the slot 13 in the circular plate conveyor 10 to have its opposite corners ground by the grinding plates 11 and 12 at the points of contact as seen in FIGS. 8 and 13. In addition, however, the bearing ring 14 is rotated within its slot 13 (see arrow 33 in FIG. 6). This rotational movement of each ring 14 results from a component of force developed by the oppositely rotating discs 11 and 12. As each bearing ring rotates within its respective slot 13, it is being ground by the grinding discs 11 and 12 while the bearing ring 14 is moved through the space between the two grinding discs 11 and 12.

As mentioned previously, the bearing ring 14 may be placed within the slots 13 in a vertical position as well as in the horizontal position shown in FIG. 7. FIG. 14 illustrates the placing of each ring 14 within a slot 13 in this vertical position.

Consider, for example, that the bearing ring 14 is positioned horizontally within the slot 13, as shown in FIGS. 6 and 7. As the ring 14 enters the space between the grinding discs 11 and 12, the aspect of the forces that come to bear on the periphery of the ring 14 are such that the speed of rotation of the ring itself will be very low and the grinding action will be very high.

The force aspect, however, changes constantly as the ring 14 is conveyed further until, for example, the ring is located in a plane passing through the shafts 27, 28 and 29. This location of the ring 14 is shown in FIG. 6. At this location, the ring 14 rotates rapidly about its own axis within its slot 13, and the grinding action is very low.

From this point on, until the ring 14 is ejected into the receptacle 19, the force aspect on the ring 14 reverses. The ring continues to rotate in the same direction but at a progressively slower rate, and the grinding action progressively increases.

In the circumstances when the ring 14 is positioned vertically within the slot 13, as shown in FIGS. 12–14, and the ring 14 enters the space between the grinding discs 11 and 12, the aspect of the forces that come to bear on the periphery of the ring 14 are such that the speed of rotation of the ring 14 is very high and the grinding action is low.

However, as the ring 14 is conveyed further until, for example, the ring is located in a plane passing through the shafts 27, 28 and 29, the force aspect changes constantly. This location of the ring is shown in FIG. 12. At this location, the ring 14 is at zero rotation, from which point the direction of rotation reverses until the ring is ejected into the receptacle 19.

The change in the force aspect on each bearing ring, coupled with changes in speed of rotation of the ring itself and changes in speed of the grinding action, result in a ground surface which is more accurate, quicker to achieve and more economical than any surface ground by heretofore methods.

Of course, the slots 13 may be formed in the plate conveyor 10 by any suitable method. Two methods for forming these slots are illustrated, respectively, in FIGS. 10 and 11 of the drawings.

Referring now to FIG. 10, the circular plate conveyor 10 is formed with a central, circular portion 40 in which flat notches 41 are cut or milled in the periphery thereof, and corresponding notches 42 are formed in an outer rim 43. When the rim 43 is placed about the periphery of the central portion 40 and the notches 41 and 42 are in alignment, a key guide hole 44 is in matching position adjacent a corresponding key guide hole 45 so that a pin 46, FIG. 9, prevents relative movement between the central portion 40 and the rim 43. The spaces at the ends of the pin 46 are plugged with a suitable compound such as solder as illustrated by the numerals 47 and 47' in FIG. 9.

An alternative procedure for forming slots in the periphery of the plate conveyor 10 is shown in FIG. 11 where deeper grooves are formed in the periphery of the plate 10 and a plug 51 is wedged within each groove resulting in the formation of a slot 13. It is preferred that each plug 51 be approximately .001 inch larger than the notch into which it is to fit into permit jamming of the plug 51 in place. Of course, any other suitable means such as an adhesive may be used to retain the plug 51 in place.

In one form of the invention, the grinding surfaces provided on the two discs 11 and 12 cover only the outer four and a half inches of the seven inch radius of each disc. Also, the circular plate conveyor 10 is approximately fifteen inches in diameter.

The structural arrangement as described above permits the bearing ring 14 to be presented to the grinding surface in every possible direction, and due to the rotation of the object within its respective slot, the entire peripheral surface is subjected to the grinding action of the discs 11 and 12.

Although illustrated in the form of a circular plate, the conveyor 10 may be any other annular shape such as elliptical, or it may be a flat horizontal conveyor passing between the grinding discs 11 and 12 in a linear manner. Also, it is understood that additional pairs of grinding discs 11 and 12 may be disposed in the path of the conveyor to grind the bearing ring further, if desired.

Further, while it has been illustrated in the drawings that the corners or edges of the bearing ring 14 are to be ground, it should be understood that each slot 13 may be positioned laterally, i.e., in the same plane or direction as the axis of the plate conveyor 10 for grinding the peripheral surface of each bearing ring 14 instead of opposite edges. However, when the bearing race is positioned horizontally in a slot, it will not fall by gravity from the slot after the grinding operation. Therefore, any other suitable means such as, for example, an air blast may be used to expel the object from the slot.

While the above description presents preferred embodiments of the apparatus and method of the invention, it will be understood that modifications may be made in the apparatus and method without departing from the scope of the invention as set forth in the appended claims.

I claim:

1. Apparatus for grinding an entire peripheral portion of a circular object to a bevel comprising
   a movable, substantially flat grinding surface,
   means to rotate said grinding surface,
   another substantially flat surface facing said grinding surface and spaced therefrom a predetermined distance,
   a conveyor positioned for movement through the space between said grinding surface and said another surface,
   said conveyor having supporting means for the object to position the plane including the circular cross section of the object at a predetermined bevel angle relative to the direction of movement of said conveyor and to contact said surfaces,
   and moving means to move said conveyor supporting means in a path between said surfaces in which torques applied by said contacting surfaces to said objects cause the rotational velocity of said object to alternatingly increase and decrease during such time as the object is between said surfaces.

2. Apparatus for grinding an entire peripheral portion of a circular object as set forth in claim 1, including means to support a plurality of objects for successive delivery to said conveyor, and said conveyor supporting means supporting a plurality of objects.

3. Apparatus for grinding an entire peripheral portion of a circular object as set forth in claim 1 in which said facing surfaces are arranged at an angle to each other.

4. Apparatus for grinding an entire peripheral portion of a circular object as set forth in claim 1 in which said conveyor is moved at a substantially slower speed than said grinding surface.

5. Apparatus for grinding entire peripheral portions of circular objects comprising
   a movable grinding surface, said surface being substantially flat,
   another substantially flat surface spaced from said grinding surface,
   said surfaces being arranged at an angle to each other,
   movable conveyor means positioned for movement through the space between said grinding surface and said another surface,
   said conveyor means having supporting means including a plurality of slots to receive the objects to position the plane including the cross section of the objects at a predetermined bevel angle relative to the direction of movement of said conveyor,
   said objects having rotational axes lying in said plane,
   and means delivering said objects to respective slots including guide means adjacent said conveyor means to aid in the positioning of each object in each of said respective slots,
   said conveyor means moving said objects in a rotational path between said surfaces to provide torque action to alternatively increase and decrease the rotational speed of said objects in said slots.

6. Apparatus for grinding entire peripheral portions of circular objects comprising
   a movable grinding suface, said surface being substantially flat,
   another substantially flat surface spaced from said grinding surface,
   said surfaces being arranged at an angle to each other,
   movable conveyor means positioned for movement through the space between said grinding surface and said another surface,
   said conveyor means having supporting means including a plurality of slots to receive the objects to position the plane including the cross section of the objects at a predetermined bevel angle relative to the direction of movement of said conveyor,
   said objects having rotational axes lying in said plane,
   means delivering said objects to respective slots including guide means adjacent said conveyor means to aid in the positioning of each object in each of said respective slots,
   said conveyor means moving said objects in a rotational path between said surfaces to provide torque action to alternatively increase and decrease the rotational speed of said objects in said slots,
   the axis of rotation of said conveyor means being spaced from the axis of said movable grinding surface and the rotational path of movement of said conveyor means being substantially between said axes.

References Cited by the Examiner

UNITED STATES PATENTS

| 752,482 | 2/04 | Thompson | 51—118 |
| 1,264,928 | 5/18 | Heim | 51—118 X |
| 1,893,100 | 1/33 | Norton | 51—118 X |
| 1,978,674 | 10/34 | Johnson | 51—118 |
| 2,497,076 | 2/50 | Ferguson | 51—290 |
| 2,580,542 | 1/52 | Heath | 51—118 |
| 2,754,635 | 7/56 | Ortegren | 51—73 |

FOREIGN PATENTS

| 223,288 | 9/22 | Canada. |
| 296,570 | 1/30 | Canada. |

J. SPENCER OVERHOLSER, *Primary Examiner.*

JOHN C. CHRISTIE, FRANK E. BAILEY, FRANK H. BRONAUGH, *Examiners.*